United States Patent [19]

Astero

[11] 3,922,079
[45] Nov. 25, 1975

[54] OPTICAL MULTIPLE PROJECTOR
[75] Inventor: Jan-Erik Astero, Tumba, Sweden
[73] Assignee: Lindaco Ltd., Switzerland
[22] Filed: Sept. 7, 1973
[21] Appl. No.: 395,134

[30] Foreign Application Priority Data
Sept. 12, 1972 Sweden.................................. 11778

[52] U.S. Cl. ...................... 353/63; 353/87; 353/94; 353/119
[51] Int. Cl.² ................... G03B 21/08; G03B 21/20
[58] Field of Search ............ 353/63, 64, 65, 66, 67, 353/94, 30-37, 121, 119; 178/7.91, 7.92, 7.85, 7.88

[56] References Cited
UNITED STATES PATENTS

| | | | |
|---|---|---|---|
| 1,341,665 | 6/1970 | Ott | 353/63 |
| 1,870,702 | 8/1932 | Zworykim | 178/7.91 |
| 2,332,691 | 10/1943 | Blaisdell | 353/63 |
| 2,414,977 | 1/1947 | Reid | 353/63 |
| 2,482,031 | 9/1949 | Rose | 353/75 |
| 2,608,126 | 8/1952 | Oestreicher | 178/7.91 |
| 3,535,030 | 10/1970 | Miller | 353/65 |
| 3,535,033 | 10/1970 | Busch | 353/94 |
| 3,744,892 | 7/1973 | Shipsey | 353/63 |

Primary Examiner—William D. Martin, Jr.
Assistant Examiner—A. Jason Mirabito
Attorney, Agent, or Firm—Toren, McGeady and Stanger

[57] ABSTRACT

There is provided an optical multiple projector comprising a projection system of overhead type, the table of which is transparent, and a TV-set, the picture screen of which is arranged under the table. The projector may further comprise a diascopic projection system and a frosted glass plate, on which an intermediate picture from the diascopic projector may be watched by the operator, and on which particulars may be pointed out.

1 Claim, 3 Drawing Figures

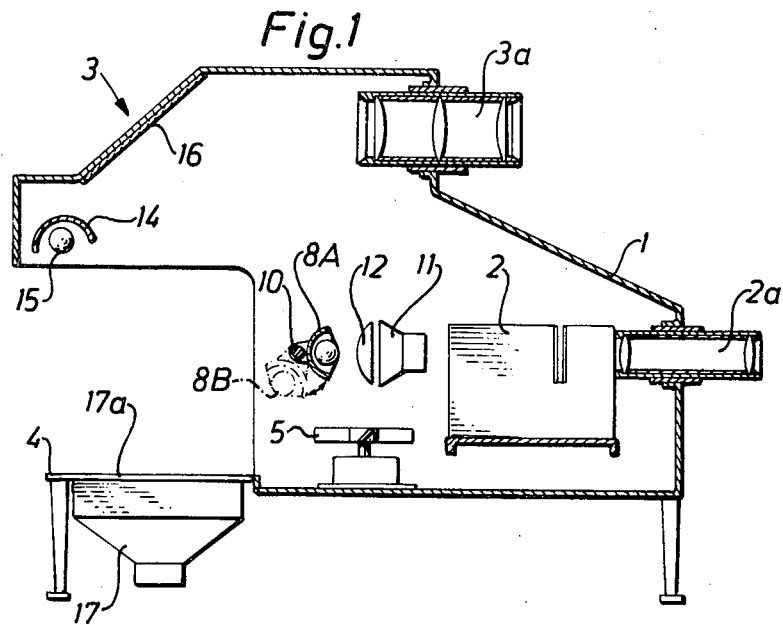
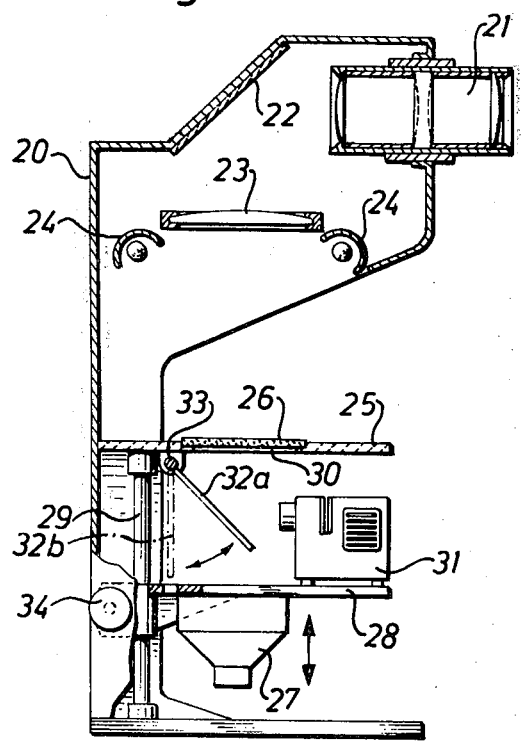

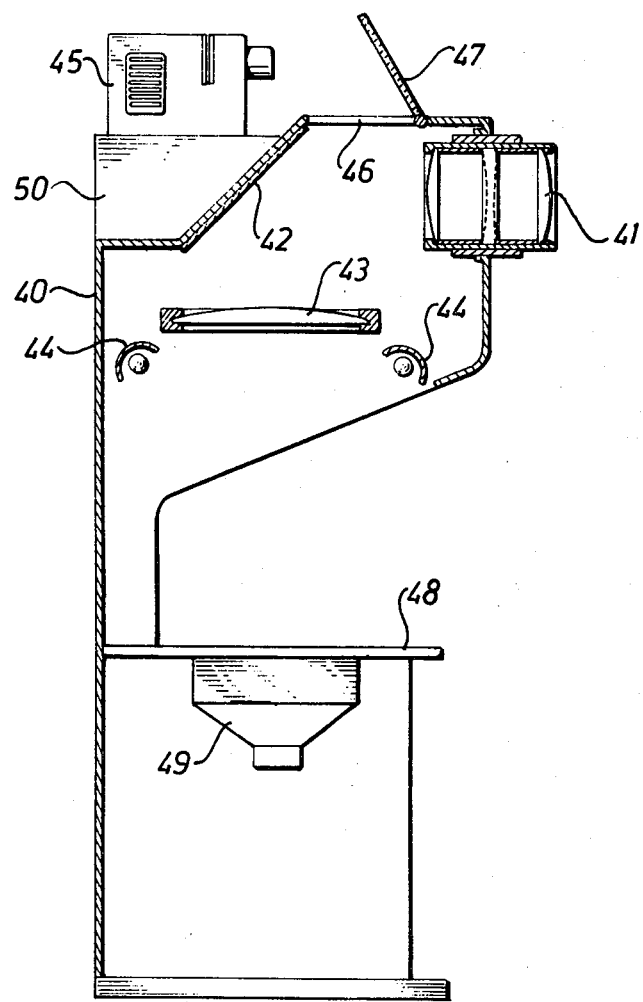

OPTICAL MULTIPLE PROJECTOR

The invention relates to an optical multiple projector. It is the general object of the invention to provide a multiple projector which is capable of projecting images of various types of pictures on a vertical screen. Such pictures may be printed matter, dia-slides, cinematographic film, stripes of dias, and the picture produced on the screen of a TV-set. It is a particular object of the invention to provide a multiple projector in which the operator can quickly shift from one type of pictures to a different type. It is another object of the invention to provide a multiple projector in which the operator has free access to the picture which is being projected on the vertical screen. This means that the operator can easily call the attention of the audience to interesting particulars of the pictures by pointing with a pencil, for example.

The multiple projector of the invention comprises a housing, a table for pictures to be projected, means for illuminating said pictures on said table, an optical system including a mirror and a lens system for projecting an image of the illuminated picture on a vertical screen, and a TVset having its picture screen in said table so as to permit the TV-picture to be projected on said vertical screen through said optical system.

The multiple projector of the invention should preferably also contain a firm projector or a diascopic projector arranged to create an intermediate image, said intermediate image being projected on said screen through said optical system. One embodiment of the invention comprises means for moving the TV-set to a position remote from the table, and means for supporting the film projector or diascopic projector in a position below the table to project a visible image on a frosted glass sheet in said table. Another embodiment of the invention comprises means for supporting the film projector or diascopic projector in a position above the table to project a visible image on said table. It is a characteristic feature of said two embodiments that an "intermediate" image or "auxiliary" image is formed on the table of the multiple projector. This intermediate or auxiliary image is visible to the operator, and therefore the operator will be able to use a pencil for indicating details of interest on said intermediate or auxiliary image. In order to facilitate the task of the operator the walls of the housing of the multiple projector should have large openings adjacent the table, to give the operator full access to the table from at least two sides.

The invention will now be described with reference to the accompanying drawings.

FIG. 1 illustrates a first embodiment of the invention.

FIG. 2 illustrates a second embodiment of the invention.

FIG. 3 illustrates a third embodiment of the invention.

The apparatus disclosed in FIG. 1 comprises a housing 1, a diascopic projector 2 having a lens system 2a, and a combined episcopic-overhead projector 3 having a lens system 3a. Further, the apparatus comprises a vertically movable table 4, for example in the form of a glass plate. The table 4 works partly as a base for the pictures to be shown by means of the episcope 3, partly as a support for a TV-set 17, which is fastened to the bottom side of the table by means of not shown fasteners, so that the image screen 17a is placed horizontally under the glass plate of the table. The fasteners are preferably designed so that a TV-set of suitable size, for example a 2, 5, 9, 12 inch of 14 inch TV-set, may be mounted under the table 4.

The Table 4 is preferably of a size that permits projection of a picture, being placed in the apparatus and being of at least A4-size, via the lens system 3a.

Further the apparatus comprises a first and a second light means. The first light means comprises a reflector 8 and a bulb 9 and is mounted on a shaft 10. The shaft 10 is arranged through the optical axis of the lens system of the diascopic projector 2 and is rotatable to two angular positions, in which the reflector 8 is in the positions 8A and 8B, corresponding to the alignment of the first light means to the different projection systems, by means of locking means (not shown). Thus, the episcope 3 is prepared for projection when the shaft 10 is turned so that the light means 6 is directed towards the table 4.

The second light means comprises a reflector 14 and a bulb 15 and is mounted in the vicinity of the mirror 16 of the episcope 3 and is directed towards the table 4. The second light means, the luminance of which may be varied, is turned on by the rotation of the shaft 10 which supports the first light means.

A funnel 11, the inside of which is highly reflecting, and a condenser lens 12 are arranged between the first light means and the diascopic projector 2, to accomplish maximum light transmission to said diascopic projector.

When the apparatus is to be used for projection of TV-images, the first and second light means are turned off, so that the TV-image is projected via the mirror 16 and the lens system 3a onto a vertical screen. The TV-set is preferably adapted for tape-cassets.

The apparatus of FIG. 2 comprises a housing 20 containing a lens system 21, a mirror 22, a condenser lens 23, and two lamps 24. The apparatus also comprises a table 25 containing an opening 30 which can be covered with a plate 26 of frosted glass. There is a space between the table 25 and the lower edge of the housing 20, enabling the operator to reach the table from three sides. Below the table 25 a TV-set 27 is suspended in a support 28. The support 28 is carried by a guide rail 29, and can be moved in the vertical direction between two positions, viz. the lower position illustrated in FIG. 2, and an upper position in which the horizontal screen of the TV-set is close to the table 25, below the opening 30. The support 28 is fastened by means of a screw 34. The apparatus also contains a diascopic projector 31 which is placed on the support 28, and a mirror 32 which is suspended from a shaft 33 and can be placed in either of the positions 32a and 32b.

When the apparatus is to be used for projecting printed matter, said printed matter is placed on the glass plate 26, and the lamps 24 are switched on. The optical system 21–23 now produces an image of the printed matter on a vertical screen. When the apparatus is to be used for dia-slides, said dia-slides are placed in the diascopic projector 31. The light from said diascopic projector 31 is reflected by the mirror 32, in the position 32a, onto the frosted glass sheet 26, thus creating an auxiliary image of the dia-slide in said frosted glass sheet 26. Said auxiliary image is visible to the operator from the upper side of the frosted glass sheet 26. Therefore, the operator can point at interesting details of said auxiliary image, by using a pencil, for example.

The auxiliary image is projected through the optical system 21–23 onto the vertical screen. Needless to say, the lamps 24 are switched off during this operation. When the TV-set 27 is to be used, the diascopic projector 31 and the frosted glass plate 26 are removed. The mirror 32 is placed in the position of 32b, and the support 28 is lifted and fixed into its upper position, in which the TV-screen is close to the opening 30 in the table 25. The image on the TV-screen is now projected on the vertical screen through the optical system 21–23.

The apparatus of FIG. 3 comprises a housing containing a lens system 41, a mirror 42, a condenser lens 43, and two lamps 44. The top wall of the housing 40 contains an opening 46 and carries a support 50 for a diascopic projector 45 and a mirror 47 to reflect the light from the projector downwards through said opening 46. The apparatus also comprises a table 48, consisting of a glass plate, and a TV-set 49 suspended from said table and having its screen situated horizontally and close to the transparent table.

When printed matter is to be projected, it is placed on the table 48 and is illuminated by means of the lamps 44, or by light from the diascopic projector 45, or both. When the apparatus is to be used for the projection of dia-slides, a white sheet is placed on the table 48, and the dia-slides are placed in the projector 45. The light from the projector 45 is reflected by the mirror 47, and an intermediate image is created on the white sheet on the table 48. It has been found, surprisingly, that the intermediate image is of a comparatively good quality in spite of the fact that the light from the mirror 47 to the table 48 passes through the condenser lens 43. Said intermediate image is projected on a vertical screen through the optical system 41–43.

What is claimed is:

1. Projection apparatus of the overhead type, comprising a TV-set having a picture tube surface arranged horizontally, a mirror positioned above said picture tube surface, for deflecting light from said picture tube surface, and a lens system for projecting the image of the picture tube surface onto a screen, said projector including a table, said TV-set being normally positioned below said table, mounted on a support, said table at its top side being provided with a frosted sheet of transparent material for the transmission of opaque pictures and full size transparencies through said lens system, light means for illuminating said frosted sheet from a position above said surface, a film projector or diascopic projector arranged to create an intermediate image on said frosted sheet, a mirror being arranged for deflecting the light from said film projector or diascopic projector to provide said intermediate image on said frosted sheet, said intermediate image being projected on said screen through said lens system, means for supporting the film projector or diascopic projector in a position below the table, and means for moving the TV-set to a position remote from the frosted sheet.

* * * * *